United States Patent [19]
Kosako

[11] Patent Number: 5,623,706
[45] Date of Patent: Apr. 22, 1997

[54] CAMERA HAVING AUTO FOCUSING AND AUTO EXPOSURE FUNCTIONS

[75] Inventor: Kosei Kosako, Tokyo, Japan

[73] Assignee: Asahi Kogaku Kogyo Kabushiki Kaisha, Tokyo, Japan

[21] Appl. No.: 505,843

[22] Filed: Jul. 24, 1995

[30] Foreign Application Priority Data

Jul. 26, 1994 [JP] Japan .................... 6-174365

[51] Int. Cl.⁶ ..................... G03B 7/00; G03B 13/36
[52] U.S. Cl. ............................. 396/67; 396/104
[58] Field of Search .................... 354/400, 402, 354/403, 406, 407, 408, 443, 441, 446, 195.11

[56] References Cited

U.S. PATENT DOCUMENTS

| | | | |
|---|---|---|---|
| 4,183,643 | 1/1980 | Imura et al. | 354/408 |
| 4,853,732 | 8/1989 | Suzuki et al. | 354/402 |
| 4,908,646 | 3/1990 | Sato et al. | 354/402 |
| 4,983,033 | 1/1991 | Suzuki | 354/403 X |
| 5,001,508 | 3/1991 | Ogawa | 354/403 |
| 5,034,768 | 7/1991 | Miyadera | 354/400 |
| 5,051,767 | 9/1991 | Honma et al. | 354/406 |
| 5,136,326 | 8/1992 | Yokota et al. | 354/476 |
| 5,146,261 | 9/1992 | Soshi | 354/402 |
| 5,220,364 | 6/1993 | Kobayshi et al. | 354/443 X |
| 5,223,887 | 6/1993 | Kobayashi et al. | 354/409 |
| 5,305,051 | 4/1994 | Irie et al. | 354/441 |
| 5,325,147 | 6/1994 | Kirigaya et al. | 354/421 |
| 5,382,997 | 1/1995 | Sato et al. | 354/441 |

*Primary Examiner*—W. B. Perkey
*Attorney, Agent, or Firm*—Greenblum & Bernstein P.L.C.

[57] ABSTRACT

A camera having a focusing lens measures one of a distance to an object to be photographed and a defocus amount of an image of the object. The camera drives the focusing lens in accordance with the measured distance or defocus amount. The camera determines an exposure value of the object to be photographed, and judges whether the measured distance or defocus amount satisfies a predetermined condition. If the predetermined condition is not satisfied, then the determined exposure value is increased. The camera then determines an aperture value and a time value for photographing the object based on the increased exposure value and a predetermined algorithm, and takes a photograph of the object.

25 Claims, 4 Drawing Sheets

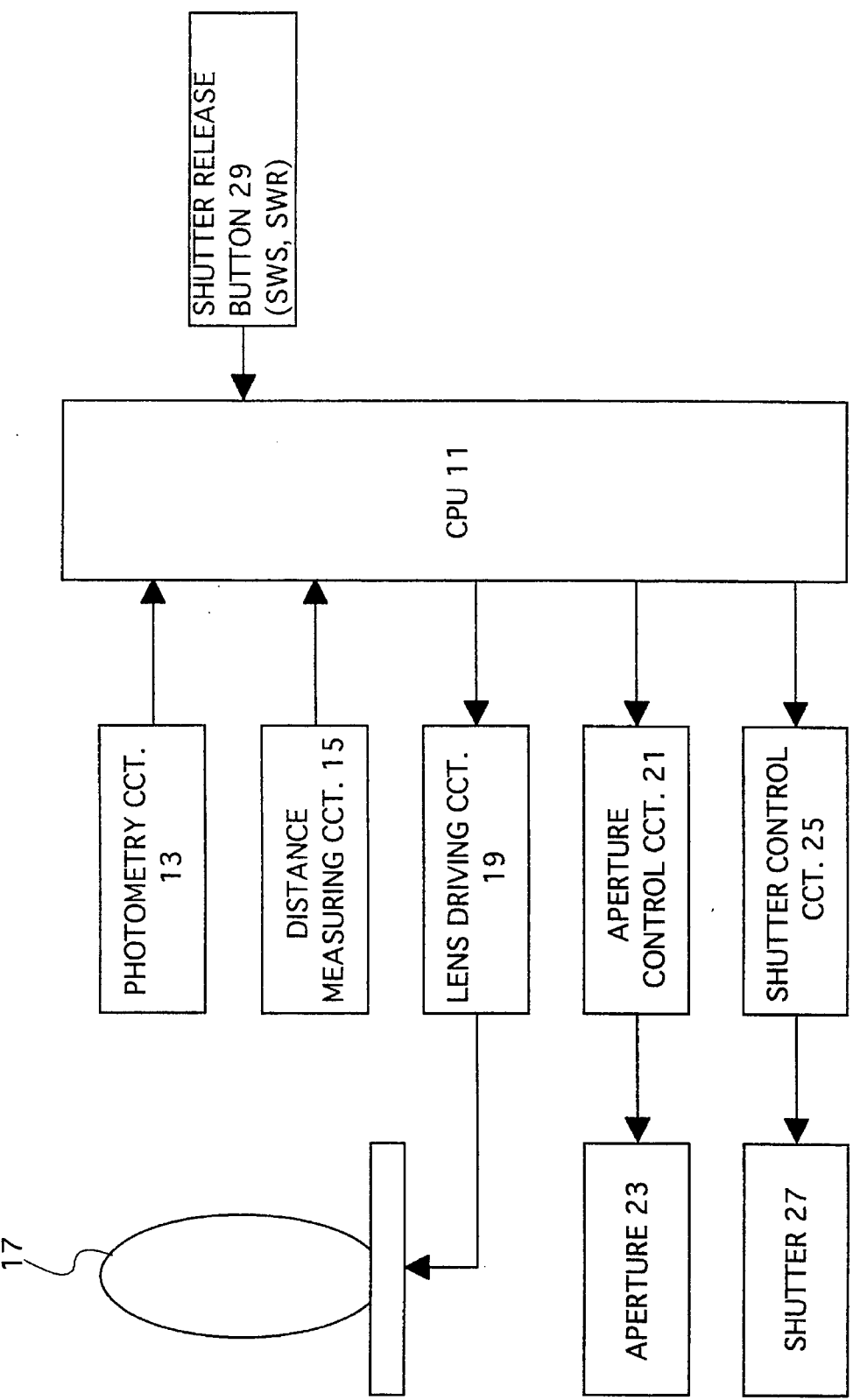

CAMERA HAVING AUTO FOCUSING AND AUTO EXPOSURE FUNCTIONS

BACKGROUND OF THE INVENTION

The present invention relates to a camera which automatically focuses a lens on an object, and which automatically determines an exposure level of an image of the object being photographed.

Presently, there are cameras, hereinafter referred to as AF cameras, which can measure a distance from the camera to the object to be photographed. In some of the AF cameras, if the distance to the object can be determined, the camera will move the lens to a predetermined position. However, if the object is too close to the camera, an out of focus image will be formed; i.e., even when the camera moves the lens to the closest focusing position, the object is out of the depth of field of the lens.

Further, in the conventional AF camera, if the distance of the object cannot be measured, the AF camera may not be able to drive the lens to a position to form an in-focus image.

Furthermore, in the conventional AF camera, if the distance can be measured, the measurement may not be reliable because, for example, the contrast of the object is low. Since the camera will position the lens to focus on the object using the measured distance, if the distance measurement used does not correspond to the actual distance of the object to be photographed, then the object may be situated out of the in-focus range of the lens, and an out of focus image will be formed.

SUMMARY OF THE INVENTION

It is therefore an object of the present invention to provide an improved AF camera which can form an in-focus image of an object to be photographed, even if the object is closer to the camera than the closest focusing distance that the lens can be driven to focus on.

It is another object of the present invention to provide an improved AF camera which can form an in-focus image of an object to be photographed, even if the distance to the object cannot be measured.

It is a further object of the present invention to provide an improved AF camera which can form an in-focus image of an object to be photographed, even if the distance to the object which can be measured is considered unreliable, because, for example, the contrast of the object is low.

According to an aspect of the present invention, there is provided a camera which has a focusing lens used to photograph an object. One of a distance to the object to be photographed and a defocus amount of an image of the object, is measured. The focusing lens is driven in accordance with the measured distance or defocus amount. The camera determines an exposure value of the object to be photographed, and judges whether the distance or defocus amount which satisfies a predetermined condition, can be measured. If the camera judges that the measured distance or defocus amount does not satisfy the predetermined condition, then the camera increases the determined exposure value. Then using a predetermined algorithm, the camera determines a combination of an aperture value and a time value, corresponding to the determined exposure value. Then the object can be photographed using the determined aperture and time values.

There are some cameras which use a single program line for controlling the photography operation. In these cameras in order to increase the aperture value, the exposure value must be increased. Therefore, by increasing the exposure value, the depth of field increases, and distance range in which an object can be located to form an in-focus image, also increases.

Further, in the camera, the mechanism for measuring the distance to the object can include a passive distance measuring device in which a pair of images of the object are projected onto a pair of position sensing light detectors. Signals output by each of the position sensing light detectors are compared, and the distance of the object from the camera is determined as result of the comparison of the signals.

Alternatively, an active distance measuring system can be used to measure the distance of the object to the camera. In the active distance measuring system, light (infrared) is projected onto the object, and light reflected by the object is detected, and is used to determine the distance of the object from the camera.

If the camera judges that the object is closer to the camera than a closest focusable position of a focusable distance range, the driving means drives the focusing lens to the closest focusable position of the range. Since the aperture value is increased and the depth of field is increased, the probability that an in-focus image will be formed is increased.

If the camera judges that the object distance is not measurable, then the driving means drives the lens to a hyperfocal distance position.

If the camera judges that the object distance is not reliable, then the driving means drives the lens to a position corresponding to the measured object distance.

If the active distance measurement system is used, and the object is not at infinity, then it is always possible to reliably measure the distance of the object.

According to another aspect of the present invention, there is provided a camera having a focusing lens. One of a distance to the object to be photographed and a defocus amount of an image of said object, is measured. The focusing lens is driven in accordance with the measured distance or defocus amount. The camera determines an exposure value of the object to be photographed, and then determines an aperture value and an exposure time value based on the determined exposure value and a predetermined algorithm such as a program line, in order to photograph the object. The camera judges whether the distance of the object or the defocus amount which satisfies a predetermined condition, can be measured. If the predetermined condition is not satisfied, the camera increases the determined aperture value. This increases the depth of field, and therefore the distance range that the object can be positioned relative to the camera, and still form an in-focus position.

Some cameras are capable of controlling the aperture value and time value separately. In these cameras it is possible to change the aperture value without changing the exposure value.

Optionally, the camera decreases the determined time value according to the increased aperture value, such that the determined exposure value remains unchanged. Thus, the image formed on the film will have the same exposure, and increased depth of field.

Alternatively, the camera decreases the time value to a minimum allowed time value. Then the camera modifies the aperture value in accordance with the time value and the exposure value. In this case, the camera ensures that the exposure can be taken, with increased depth of field, even if the light level is low.

Further optionally, the camera increases the aperture value to a maximum allowed value. This will maximize the depth of field of the lens, and therefore maximizing the distance range within which the object can be positioned, and still form an in-focus image.

Acording to a fruther object of the present invention, a method is provided for determining an aperture value (Av) and a time value (Tv) for photographing an object. The method comprises the steps of measuring a distance to the object to the photographed and a defocus amount of an image of the object, determining an exposure value of the object, and determining te aperture value and the time value based on the exposure value and in accordance with a predetermined algorithm, such as a program line.

The method further includes judging whether the measured distance of the object and the defocus amount of the image satisfies a predetermined condition and increasing the determined aperture value if the judging step judges that the predetermined condition is not satisfied.

Thus, the depth of field of a lens of a camera used to photograph the object is increased, and the range of distance in which the object can be positioned to form an focus image, is increased.

BRIEF DESCRIPTION OF THE DRAWINGS

FIG. 1 is a block diagram illustrating a control system of a camera according to the present invention;

DESCRIPTION OF THE EMBODIMENTS

Figure 2A:
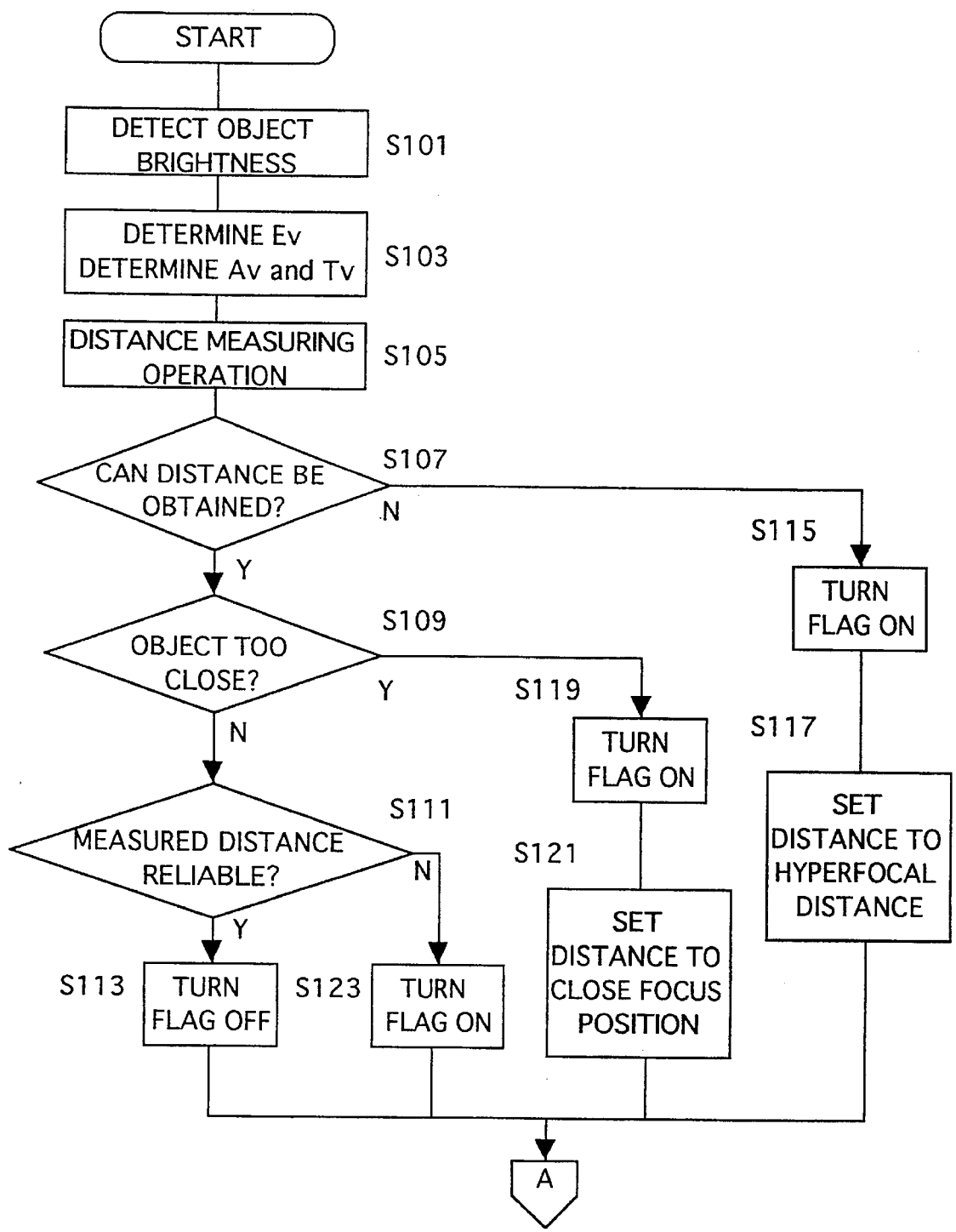
FIGS. 2A and 2B show a flowchart of an operation of the camera shown in FIG. 1.

FIG. 1 is a block diagram showing a control system of a lens shutter AF camera which embodies the present invention.

The camera has a CPU 11 for controlling an operation of the entire camera. The CPU 11 detects a brightness of an object (not shown) to be photographed, by using a photometry circuit 13. The CPU 11 determines an optimum exposure value Ev, based on the measured brightness of the object. The CPU 11 then determines an aperture value Av, and a shutter speed (time value) Tv, according to a predetermined algorithm. In the embodiment, the predetermined algorithm may be a program line in a program mode of the camera. In this case, the values Av and Tv are determined from the program line. The values Ev, Av and Tv are related by the APEX equation shown below:

$$Ev=AV+Tv$$

In the embodiment, the camera has only one program line, and therefore each Ev value has a corresponding unique combination of Av and Tv values.

The CPU 11 then determines the distance of the object to be photographed from the camera, by using the distance measuring circuit 15. The distance measuring circuit 15 employs a passive distance measurement system. The passive distance measurement system has a pair of optical elements for forming a pair of images on a pair of position detecting light sensors. In this embodiment, the pair of optical elements receive light directly from the object to be photographed. Since the positional relationship between the pair of optical elements and the pair of position detecting sensors is known, then the distance to the object can be measured by comparing a pair of signals output by the two adjacent position detecting light sensors.

Based on the distance of the object from the camera measured by the distance measuring circuit 15, the CPU 11 calculates a lens driving amount that is required to move the focusing lens 17 to an in-focus position. The CPU 11 then controls a lens driving circuit 19 to drive the focusing lens 17 by the calculated lens driving amount. When the focusing lens 17 is at the in-focus position an in-focus image of the object is formed.

When the CPU 11 has determined the values Av and Tv, the CPU 11 controls the aperture control circuit 21 to set the size of an aperture 23, of (recited light shielding plates not shown) corresponding to the Av value. Further, the CPU 11 controls a shutter driving circuit 25 to control a speed of a shutter 27, such that an exposure is made for a time corresponding to the Tv value.

A release button 29, which actuates two switches (i.e., a photometry SWS and a shutter release switch SWR), controls the operation of the CPU 11. If the release button 29 is depressed halfway, the photometry switch SWS is turned on, and the CPU 11 performs the photometry and distance measuring operations. If the release button 29 is fully depressed, the shutter release switch SWR is turned on and the shutter 27 is released.

The data sent from the distance measuring circuit 15 to the CPU 11 is examined, and the CPU 11 determines whether the distance to the object can be obtained from the data. If the distance can be obtained, the CPU determines the distance and drives the lens accordingly. Since the data obtained from the data measuring circuit 15 may not properly indicate the distance to a specific object (as a result of low contrast between the object and background), the CPU 11 also determines the reliability of the obtained data.

To do so the CPU 11 controls the lens driving circuit 19 to position the lens 17 at its hyperfocal distance position (i.e., just in front of infinity but not focusing directly at infinity) if the distance of an object from the camera cannot be accurately measured because the contrast is very low or there are multiple objects. If the measured object distance is smaller than a minimum in-focus distance, the CPU 11 controls the lens driving circuit 19 to position the lens 17 to focus as close as possible.

When the lens 17 is controlled to focus as close as possible, the CPU 11 controls the aperture control circuit to reduce the size of the aperture 23 thereby increasing the depth of field. This results in the lens 17 being able to produce an in-focus image of an object which is closer to the camera than the minimum in-focus distance. This increases the effective focusing range of the camera.

The above feature of the present invention will be described in more detail below with reference to FIGS. 2A and 2B.

Figure 2B:
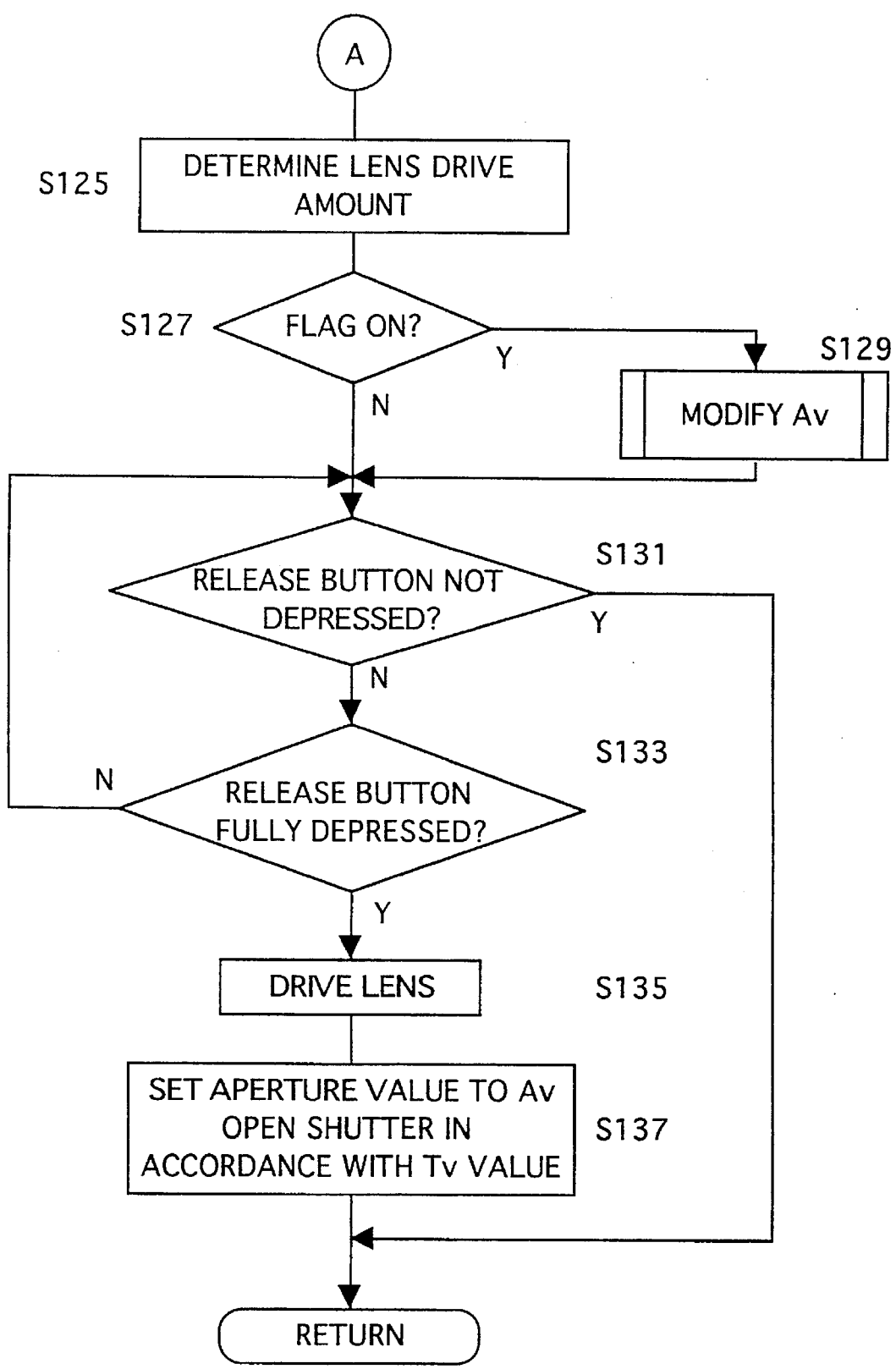

FIGS. 2A and 2B show a flowchart of an operation of the camera embodying the present invention. The operation shown is a release interruption routine of the camera, and occurs when the photometry switch SWS is turned ON (i.e., the release button 29 is depressed halfway).

In step S101, the brightness of the object to be photographed is measured. Then, in step S103, the exposure value Ev is determined based on the detected brightness of the object and the values Av and Tv are also determined in accordance with the program line of the camera.

The camera measures the distance to the object to be photographed in step S105. By measuring the distance to the object, a range for driving the focusing lens to the in-focus position can be determined. At step S107, CPU 11 then determines whether the distance to the object can be obtained. If not (S107:N), an "Av-modify" flag which is used indicating that the Av value should be modified is turned ON in step S115. Then, in step S117, the object distance is set to a distance corresponding camera, (i.e., at the hyperfocal distance of the lens is set to focus slightly in front of infinity). The lens drive amount is then determined in step S125.

If the object distance can be obtained (S107:Y), step S109 determines whether the object is too close to the camera, i.e., the object is too close between the camera and a minimum distance that the lens can focus on to form an in-focus image.

If the object is too close to the camera (S109:Y), the "Av-modify" flag is turned ON in step S119, and the object distance is set to a closest focusable distance in step S121. The lens drive amount is then determined in step S125.

If the object is not too close to the camera (S109:N), the CPU 11 determines if the measured distance is reliable in step Sill, as described above. If the measurement is not reliable (Sill:N), the "Av-modify" flag is turned ON in step S123, and the lens drive amount is determined in step S125 using the distance measured in step S105.

In case the distance measured is reliable (S111:Y), the "Av-modify" flag is turned OFF in step S113 and the lens drive amount is determined in step S125 using the distance measured in step S105.

Step S127 then checks whether the "Av-modify" flag is turned ON. If the "Av-modify" flag is turned ON (S127:Y), the Av value is modified in step S129. Otherwise, control proceeds to step S131. The modification of the Av value will change the depth of field of the lens, thereby changing (i.e., increasing) the in-focus range of the lens. The modification of the Av value will be described later.

Step S131 checks whether the release button is not depressed. If the release button is not depressed (S131:Y), the photometry switch SWS is turned OFF and the routine ends. Otherwise, step S133 checks whether the release button is fully depressed. If the release button is not fully depressed, only the photometric switch SWS is turned ON, and control goes to step S131.

If the release button is fully depressed, the photometry switch SWS and the shutter release switch SWR are turned ON. The lens is driven in step S135, and the film is exposed in step S137. The operation is then finished.

As mentioned above, the Av value is modified and a new value Tv is determined. The modification of the Av value according to a first embodiment of the present invention will be described with reference to FIG. 3.

Figure 3:
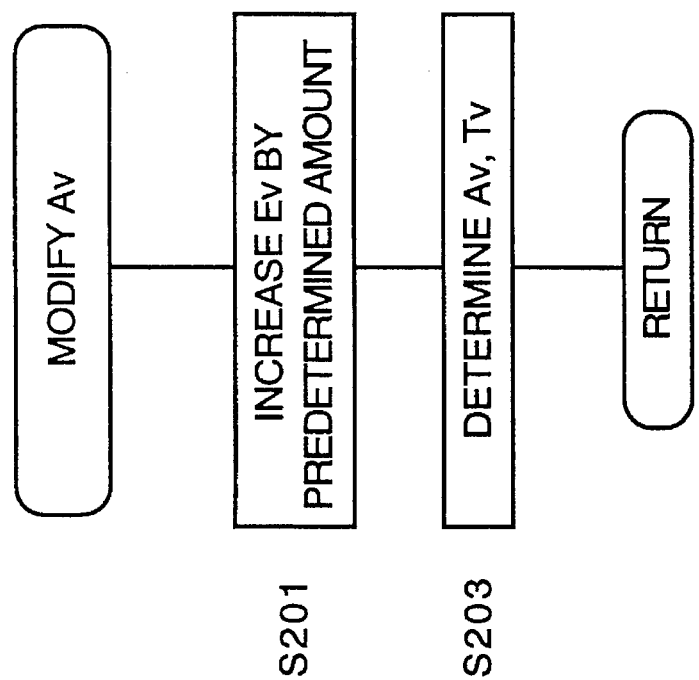
FIG. 3 shows a flowchart of a subroutine of the operation shown in FIGS. 2A and 2B, according to a first embodiment of the present invention.

As shown in FIG. 3, step S201 increases the Ev value by a predetermined amount. Step S203 determines new Av and Tv values in accordance with the program line of the camera. In the camera having the first embodiment of the present invention, when the Ev value is increased, the Av value is increased, according to the program line of the camera. By increasing the Av value, the size of the aperture is reduced and the depth of field is increased. Therefore, the in-focus range of the lens is increased, and thus objects normally too close to the camera can be brought into focus. Control then returns to the operation shown in FIGS. 2A and 2B.

Figure 4:
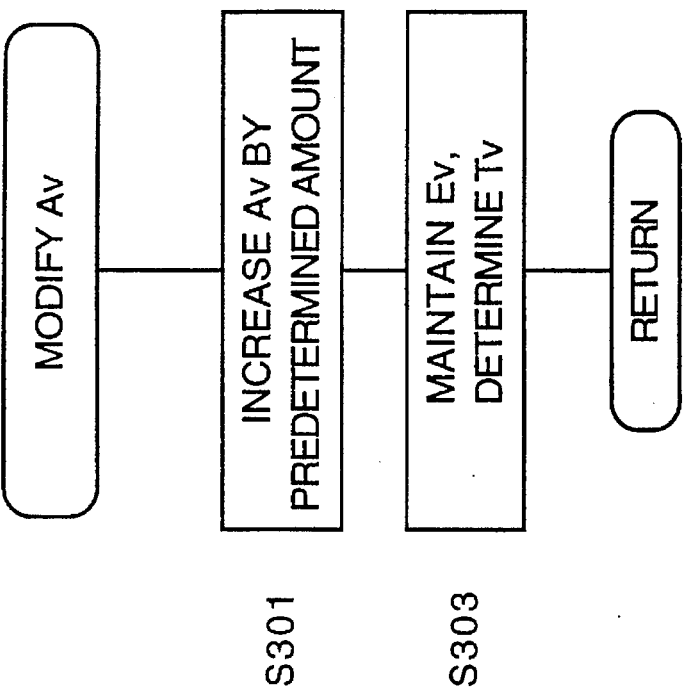
FIG. 4 shows a flowchart of a subroutine of the operation shown in FIGS. 2A and 2B, according to a second embodiment of the present invention.

FIG. 4 shows a flowchart of a subroutine for modifying the Av value, according to a second embodiment of the present invention.

As shown in FIG. 4, step S301 increases the Av value by a predetermined amount. Step S303 determines a new Tv value based on the original, unmodified Ev value and the new Av value. In the camera according to the second embodiment, since the Av value is increased, the size of the aperture is reduced and the depth of field is increased. Further, in the second embodiment, the camera can control the Av and Tv independently. Therefore, the Ev value can be maintained and the film is exposed in accordance with the correct amount of light in order to form the image. Control then returns to the operation shown in FIGS. 2A and 2B.

Alternatively, in a modification of the above procedure shown in FIG. 4, the Av value is set to a maximum value, thereby setting the depth of field to a maximum value. Then, the Tv value is adjusted such that the Ev value is maintained. However, if the object is too dimly lit, it may not be possible to obtain a Tv value corresponding to the maximum Av value, while maintaining the Ev value. In this case, the minimum Tv value should first be determined, and then the maximum Av value that can maintain the Ev value, should be determined.

In another modification, when the Tv value is determined prior to determining the Av value, the Ev value can be set higher, provided that the higher Ev value still results in an acceptable exposure being produced on the film (this will depend on the characteristics or latitude of the film).

If the present invention is used in a camera in which only the aperture value is automatically determined, then by setting the Ev value higher (by 0.5 to 2.0 Ev), an acceptable exposure can be taken.

In the two embodiments described above, a lens shutter camera is used. However, the present invention may be applied to any camera, such as an SLR camera, having an autofocus lens or at least automatic lens aperture control.

Generally, in the SLR camera, a passive TTL method is employed to drive the focusing lens to the in-focus position such that an in-focus image of the object to be photographed is formed. The passive TTL method is a method where a pair of sensors are provided to receive light that has passed through the focusing lens of the camera, and to form a pair of images on a pair of position detecting sensors, to detect a defocus amount. The defocus amount is used to determine the lens driving amount required to drive the focusing lens to the in-focus position.

Further, in the embodiments described above, the camera has only one program line. However, the present invention is also applicable to a camera having more than one program line. In this case, each Ev value has a multiple combinations of Av and Tv values.

Thus, according to the present invention, if an AF camera having an auto exposure function is to take a photograph of an object that is too close to the camera and would normally produce an out-of-focus photograph, the lens is driven to its minimum in-focus position, and the aperture of the lens is made smaller than the aperture size determined from the program line, thereby increasing the depth of field of the lens. The in-focus range of the lens is therefore increased and an in-focus photograph can be taken.

Further, when the distance cannot be detected, the lens is driven to its hyperfocal distance position, and the aperture value is reduced. This increases the depth of field of the lens, and the effective in-focus range of the lens.

Furthermore, if the CPU 11 determines that the distance data is unreliable, the lens is driven to the position corresponding to the measured distance, and then the aperture value of the lens is made smaller than the expected aperture value. This increases the depth of field of the lens, and the in-focus range of the lens.

The modification of the aperture value as described above, is a temporary modification, and is in effect only while the photometry switch SWS is ON. Therefore, after an exposure has been taken, the aperture value of the lens may not require modification for the next exposure, if the distance to the object can be reliably measured and the object is not too close to the camera.

The present disclosure relates to subject matter contained in Japanese Patent Application No. HEI 6-174365 filed on Jul. 26, 1994 which is expressly incorporated herein by reference in its entirety.

What is claimed is:

1. A camera, comprising:

a focusing lens;

means for measuring one of a distance to an object to be photographed and a defocus amount of an image of said object to be photographed;

means for driving said focusing lens in accordance with one of said measured distance or said measured defocus amount;

means for determining an exposure value of said object to be photographed;

means for judging whether said one of said distance to said object and said defocus amount, which satisfies a predetermined condition, can be measured;

means for increasing said determined exposure value in response to said judging means judging that said predetermined condition is not satisfied;

means for determining an aperture value and a time value for photographing said object based on said exposure value, in accordance with a predetermined algorithm; and means for controlling said camera to photograph said object in accordance with said determined exposure value, wherein said predetermined condition includes a condition that said object distance is within a focusable distance range of said focusing lens, and wherein said driving means drives said focusing lens to a closest focusable position of said image when said judging means judges that said object is closer to said camera than said closest focusable position.

2. A camera, comprising:

a focusing lens;

means for measuring one of a distance to an object to be photographed and a defocus amount of an image of said object to be photographed;

means for driving said focusing lens in accordance with one of said measured object distance or said measured defocus amount;

means for determining an exposure value of said object to be photographed;

means for judging whether said one of said object distance and said defocus amount, which satisfies a predetermined condition, can be measured;

means for increasing said determined exposure value in response to said judging means judging that said predetermined condition is not satisfied;

means for determining an aperture value and a time value for photographing said object based on said exposure value, in accordance with a predetermined algorithm; and means for controlling said camera to photograph said object in accordance with said determined exposure value, wherein said predetermined condition includes a condition that said one of said object distance and said defocus amount is measurable, said driving means driving said lens to a hyperfocal distance position when said judging means judges that said one of said object distance and said defocus amount is not measurable.

3. A camera, comprising:

a focusing lens;

means for measuring one of a distance to an object to be photographed and a defocus amount of an image of said object to be photographed;

means for driving said focusing lens in accordance with one of said measured object distance or said measured defocus amount;

means for determining an exposure value of said object to be photographed;

means for judging whether said one of said object distance and said defocus amount, which satisfies a predetermined condition, can be measured;

means for increasing said determined exposure value in response to said judging means judging that said predetermined condition is not satisfied;

means for determining an aperture value and a time value for photographing said object based on said exposure value, in accordance with a predetermined algorithm; and means for controlling said camera to photograph said object in accordance with said determined exposure value, wherein said predetermined condition includes a condition that said one of said measured object distance and said defocus amount is reliable, said driving means driving said lens to a position corresponding to said one of said measured object distance and said defocus amount, even when said judging means judges that said one of said measured object distance and said defocus amount is not reliable.

4. A camera, comprising:

a focusing lens;

means for measuring one of a distance to an object to be photographed and a defocus amount of an image of said object to be photographed;

means for driving said focusing lens in accordance with said one of said measured distance and said measured defocus amount;

means for determining an exposure value of said object to be photographed;

means for determining an aperture value and means for determining a time value for photographing said object, based on said determined exposure value and in accordance with a predetermined algorithm;

means for judging whether said one of said distance to said object and said defocus amount which satisfies a predetermined condition can be measured; and means for increasing said determined aperture value in response to said judging means judging that said predetermined condition is not satisfied, wherein said predetermined condition includes a condition that said object distance is within a focusable distance range of said focusing lens, and wherein said driving means drives said focusing lens to a closest focusable position of said focusable distance range when said judging means judges that said object is closer than said closest focusable position.

5. The camera according to claim 4, further comprising means for decreasing said determined time value according to said increased aperture value, such that said determined exposure value remains unchanged.

6. The camera according to claim 4, wherein said aperture value determining means increases said aperture value to a maximum allowed value.

7. The camera of claim 4, wherein said time value determining means includes means for decreasing said time value to a minimum allowed time value, and wherein said aperture value determining means modifies said aperture value based on said time value and said exposure value.

8. A camera, comprising:

a focusing lens;

means for measuring one of a distance to an object to be photographed and a defocus amount of an image of said object to be photographed;

means for driving said focusing lens in accordance with said one of said measured abject distance and said measured defocus amount;

means for determining an exposure value of said object to be photographed;

means for determining an aperture value and means for determining a time value for photographing said object, based on said determined exposure value and in accordance with a predetermined algorithm;

means for judging whether said one of said object distance and said defocus amount which satisfies a predetermined condition can be measured; and means for increasing said determined aperture value in response to said judging means judging that said predetermined condition is not satisfied, wherein said predetermined condition includes a condition that said one of said object distance and said defocus amount is measurable, said driving means driving said lens to a hyperfocal distance position when said judging means judges that said one of said object distance and said defocus amount is not measurable.

9. The camera according to claim 8, wherein said time value determining means includes means for decreasing time value to a minimum allowed time value, and wherein said aperture value determining means modifies said aperture value based on said time value and said exposure value.

10. The camera according to claim 8, wherein said aperture value determining means increases said aperture value to a maximum allowed value.

11. The camera of claim 8, further comprising means for decreasing said determined time value according to said increased aperture value, such that said determined exposure value remains unchanged.

12. A camera, comprising:

a focusing lens;

means for measuring one of a distance to an object to be photographed and a defocus amount of an image of said object to be photographed;

means for driving said focusing lens in accordance with said one of said measured object distance and said measured defocus amount;

means for determining an exposure value of said object to be photographed;

means for determining an aperture value and means for determining a time value for photographing said object, based on said determined exposure value and in accordance with a predetermined algorithm;

means for judging whether said one of said object distance and said defocus amount which satisfies a predetermined condition can be measured; and means for increasing said determined aperture value in response to said judging means judging that said predetermined condition is not satisfied, wherein said predetermined condition includes a condition that said one of said measured object distance and said defocus amount is reliable, said driving means driving said lens to a position corresponding to said one of said measured object distance and said defocus amount, even when said judging means judges that said one of said object distance and said defocus amount is not reliable.

13. The camera according to claim 12, wherein said aperture value determining means increases said aperture value to a maximum allowed value.

14. The camera of claim 12, further comprising means for decreasing said determined time value according to said increased aperture value, such that said determined exposure value remains unchanged.

15. The camera of claim 12, wherein said time value determining means includes means for decreasing said time value to a minimum allowed time value, and wherein said aperture value determining means modifies said aperture value based on said time value and said exposure value.

16. A method for determining an aperture value and a time value for photographing an object, comprising the steps of:

measuring one of a distance to the object to be photographed and a defocus amount of an image of the object;

determining an exposure value of the object;

determining the aperture value and the time value in accordance with a predetermined algorithm;

judging whether the measured distance of the object and the defocus amount of the image satisfy a predetermined condition; and increasing the determined aperture value when the judging step judges that the predetermined condition is not satisfied, wherein the predetermined condition includes a condition that the object distance is greater than a closest focusable distance, the method further comprising the step of driving the focusing lens to a closest focusable position when the judging step judges that the object distance is less than the closest focusable distance.

17. The method according to claim 16, further comprising the step of decreasing said determined time value according to said increased aperture value, such that said determined exposure value remains unchanged.

18. The method of claim 11, wherein a camera comprises a photographing lens that includes a focusing lens, said method further comprising the step of reducing a size of an aperture of the photographing lens in accordance with the increased aperture value.

19. A method for determining an aperture value and a time value for photographing an object, comprising the steps of:

measuring one of a distance to the object to be photographed and a defocus amount of an image of the object;

determining an exposure value of the object;

determining the aperture value and the time value in accordance with a predetermined algorithm;

judging whether the measured object distance and the defocus amount of the image satisfy a predetermined condition; and increasing the determined aperture value when the judging step judges that the predetermined condition is not satisfied, wherein the predetermined condition includes a condition that the one of the object distance and the defocus amount is measurable, the method further comprising the step of driving the lens to a hyperfocal distance position if the judging step judges that the one of the object distance and defocus amount is not measurable.

20. The method of claim 19, further comprising the step of decreasing said determined time value according to said increased aperture value, such that said determined exposure value remains unchanged.

21. The method of claim 19, wherein a camera comprises a photographing lens that includes a focusing lens, the method further comprising the step of reducing a size of an aperture of the photographing lens in accordance with the increased aperture value.

22. A method for determining an aperture value and a time value for photographing an object, comprising the steps of:

measuring one of a distance to the object to be photographed and a defocus amount of an image of the object;

determining an exposure value of the object;

determining the aperture value and the time value in accordance with a predetermined algorithm;

judging whether the measured object distance and the defocus amount of the image satisfy a predetermined condition; and increasing the determined aperture value when the judging step judges that the predetermined condition is not satisfied, wherein the predetermined condition includes a condition that the one of the measured object distance and the defocus amount is reliable, the method further comprising the step of driving the lens to a position corresponding to the one of the measured object distance and defocus amount, when the judging step judges that the one of the object distance and defocus amount is not reliable.

23. The method of claim 22, further comprising the step of decreasing said determined time value according to said increased aperture value, such that said determined exposure value remains unchanged.

24. The method of claim 22, wherein a camera comprises a photographing lens that includes a focusing lens, the method further comprising the step of reducing a size of an aperture of the photographing lens in accordance with the increased aperture value.

25. A camera, comprising:

a control unit; and a lens, said lens having an aperture that is changed to increase a depth of field when said control unit determines that at least one of the following conditions exist:

(a) an object to be photographed is closer to said camera than a closest focusable position range of said lens;

(b) an object distance of the object to be photographed can not be measured; or (c) said object distance is determined to not be reliable.

* * * * *

UNITED STATES PATENT AND TRADEMARK OFFICE
CERTIFICATE OF CORRECTION

PATENT NO.   : 5,623,706
DATED        : April 22, 1997
INVENTOR(S)  : Kosei Kosako It is certified that error appears in the above-indentified patent and that said Letters Patent is hereby corrected as shown below:

Column 10, line 51 (claim 18, line 1), change "11," to --16,--.

Signed and Sealed this

Twenty-sixth Day of August, 1997

Attest:

BRUCE LEHMAN

Attesting Officer

Commissioner of Patents and Trademarks